United States Patent [19]

Whyte

[11] Patent Number: 4,636,708

[45] Date of Patent: Jan. 13, 1987

[54] STATIC VAR GENERATOR

[75] Inventor: Ian A. Whyte, Churchill, Pa.

[73] Assignee: Westinghouse Electric Corp., Pittsburgh, Pa.

[21] Appl. No.: 741,426

[22] Filed: Jun. 5, 1985

[51] Int. Cl.$^4$ .............................................. G05F 1/70
[52] U.S. Cl. ................................... 323/210; 323/209; 363/54; 361/100; 361/111
[58] Field of Search ............................... 323/208–211; 363/50, 53, 54; 361/56, 57, 91, 93, 100, 111

[56] References Cited

U.S. PATENT DOCUMENTS

| | | | |
|---|---|---|---|
| 3,999,117 | 12/1976 | Gyugyi et al. | 323/211 |
| 4,156,176 | 5/1979 | Gyugyi et al. | 323/210 |
| 4,188,573 | 2/1980 | Gyugyi et al. | 323/210 |
| 4,302,715 | 11/1981 | Putman et al. | 323/210 |
| 4,356,441 | 10/1982 | Putman et al. | 323/210 |
| 4,394,614 | 7/1983 | Brennen et al. | 363/54 X |
| 4,398,141 | 8/1983 | Brennen et al. | 363/54 X |
| 4,496,899 | 1/1985 | Lippitt et al. | 323/210 X |
| 4,555,659 | 11/1985 | Gyugyi | 323/210 |
| 4,571,535 | 2/1986 | Gyugyi | 323/211 |

FOREIGN PATENT DOCUMENTS 5578651  1/1982  Japan ................................ 361/100

Primary Examiner—Patrick R. Salce
Assistant Examiner—Emanuel Voeltz
Attorney, Agent, or Firm—M. J. Moran

[57] ABSTRACT

A static VAR generator for providing reactive power compensation to an n-phase AC network subject to transient surge currents utilizing mechanically switched shunt circuits in parallel with the thyristor arrays.

18 Claims, 1 Drawing Figure

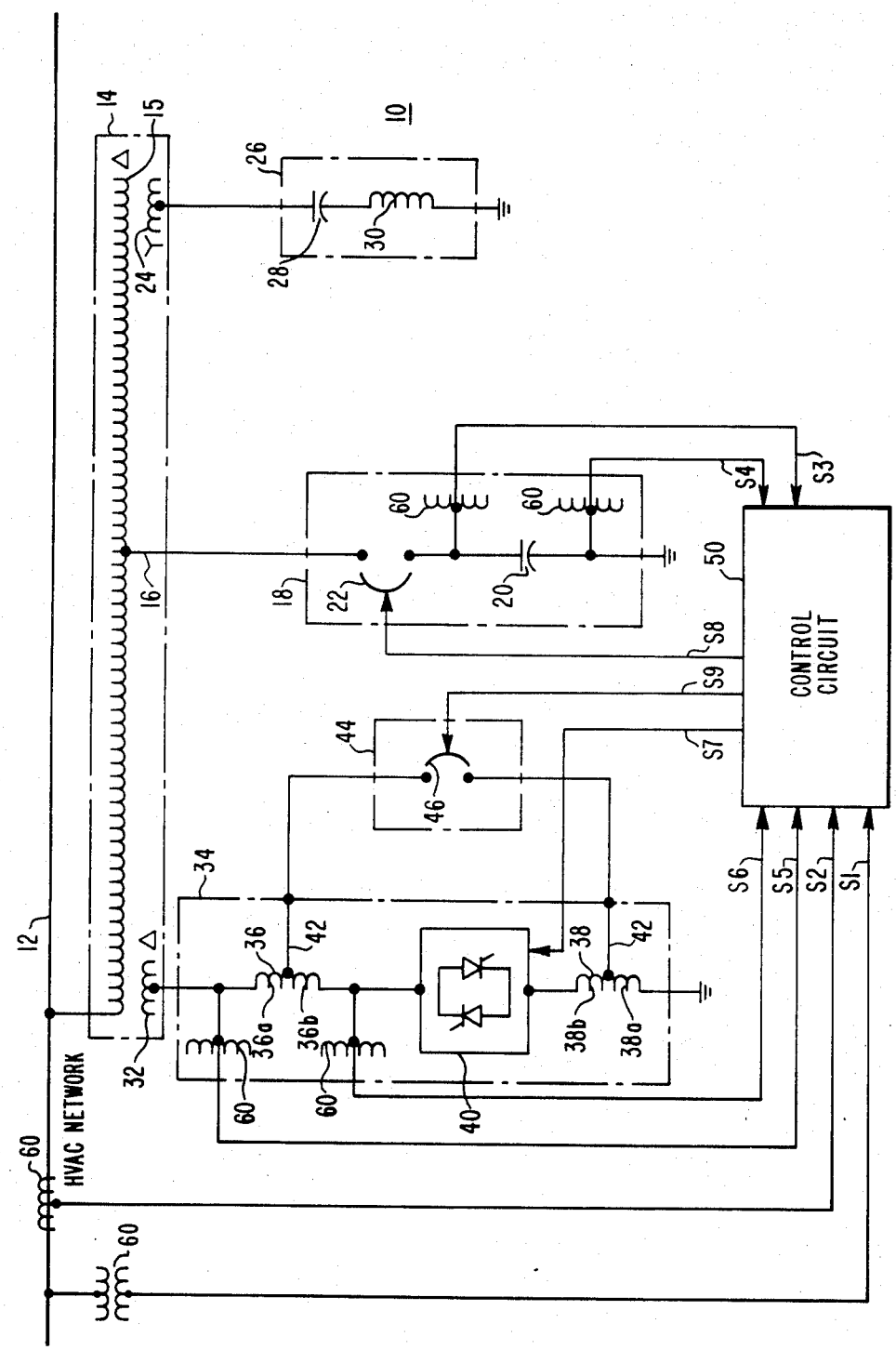

4,636,708

STATIC VAR GENERATOR

BACKGROUND OF THE INVENTION

1. Field of the Invention:

This invention relates generally to static VAR generators and more particularly to static VAR generators utilizing anti-parallel thyristors for inserting reactors for network stability and power factor correction having thyristor circuit surge protecting means.

2. Description of the Prior Art:

In static VAR generators using anti-parallel thyristors for switching of reactors into an AC network or for controlling the current through the reactors for the purposes of power system stability and power factor correction, abnormal conditions sometimes occur in the system where transient currents may pass through the thyristor circuits that greatly exceed the current rating of the thyristor banks damaging the thyristors and inhibiting the reliability of the system. It would be desirable to limit the current passing through the thyristor circuits in the event of such current surging conditions. Some methods employ lower cost mechanical switches in a shunt circuit arrangement so that surging currents would not pass through the thyristor array. However, in such situations the thyristors array is short-circuited eliminating the current required to turn the thrystor arrays back on to maintain the reactors in the AC network after the transient conditions have passed and before the shunt is removed. Thus it would be advantageous to have a static VAR generator utilizing lower cost mechanically switched shunt circuits that will still allow operation of the thyristor arrays to turn on after the occurrence of transient surge current. A further advantage could be realized if the mechanical switch in the shunt circuit could be opened or closed only when the thyristor array was conducting. This would allow the use of a switch having lower voltage and current ratings.

SUMMARY OF THE INVENTION

There is provided by this invention a novel static VAR generator arrangement in which protection for thyristor arrays is provided in the event of transient surging current conditions that effectively shunts the transient surging currents from the thyristor arrays using a mechanically switched shunt circuit while allowing sufficient power to turn the thyristors on when the surging conditions subside. Consequently, due to this arrangement the current through the reactors are only limited by the value of the inductances and by the magnitude of the applied voltage rather than by the thermal and current ratings of the thyristor arrays used for control of the reactors. This is a distinct advantage because thyristors with lower current ratings may be used and this results in a significant cost savings.

In an alternate embodiment the controller of static VAR generator is further adapted to permit operation of the mechanically switched shunt circuit only when the thyristors' arrays are conducting. Additionally, an impedance can be included in series with the mechanically switched shunt circuit.

BRIEF DESCRIPTION OF THE DRAWING

For a better understanding of the invention, reference may be made to the embodiment exemplary of the invention shown in the accompanying single line schematic diagram of a static VAR generator incorporating the principles of this invention.

DETAILED DESCRIPTION

In the following description the invention is configured for a 3-phase network. In general the invention is applicable to an n-phase AC network where preferably n is equal to 1 or 3.

There is shown in the figure, a static VAR generator 10 wherein one phase of a 3 phase AC network is shown at 12. The AC network 12 is connected via a multiwinding transformer, such as the autotransformer 14, to the various circuit elements of the static VAR generator 10. The primary windings 15 are delta-connected and are connected at tap 16 to a capacitor bank 18 that comprises at least one capacitor 20 electrically connected in series with an electromechanical switch 22. The switch 22 may be a vacuum or a $SF_6$ type circuit interrupter generally known in the prior art. Connected to the wye-connected secondary windings 24 of the autotransformer 14 is the filter circuit 26 that includes a series-connected fixed capacitor 28 and a fixed reactor 30. The filter circuit 26 serves as an harmonic filter as well as providing a fixed source of reactive compensation to the AC network 12. A set of delta-connected secondary windings 32 are used to connect the thyristor-controlled reactor circuit 34 to the AC network 12. The thyristor-controlled reactor circuit 34 includes compensating reactors 36 and 38 which are connected via the thyristor array 40 comprised of at least one pair of anti-parallel thyristors. Preferably a tap 42 is provided on each of the reactors 36 and 38 dividing the reactors into first segments, 36a and 38a, and second segments, 36b and 38b. To the taps 42 on each compensating reactor is connected a shunt circuit 44 controlled by means of an electromechanical switch 46. The shunt circuit 44 is in parallel with series circuit consisting of the segments 36b and 38b of the compensating reactors 36 and 38, respectively, and the thyristor array 40. The switch 46 may also be a vacuum or $SF_6$ type circuit interrupter generally known in the prior art. Typically, the capacitor bank 18, the filter circuit 26, and the thyristor controlled reactor circuit 34 would be provided for each phase in the AC network.

A conventional transformer can also be used in lieu of the autotransformer. With either type, the winding arrangement would correspond to the number of phases in the AC network. Also the transformer can be eliminated, however this is usually not the case. Without the transformer the components in the static VAR generator would require voltage ratings corresponding to the network voltage.

A control circuit 50 is provided to control the operation of the static VAR generator 10. Serving as inputs for the control circuit 50 are voltage and current signals S1 and S2, respectively, from the AC network 12; voltage and current signals S3 and S4, respectively, from the capacitor bank 18; and voltage and current signals S5 and S6, respectively, from the thyristor-controlled reactor 34. Voltage and current transducers 60, such as potential and current transformers, are used to obtain the proper range and magnitude for the input signals S1–S6. Signal S7 is an output from the control circuit applied to the gate electrodes of the thyristors in the thyristor array 40. This signal controls the conduction angle of the thyristor array 40 allowing the thyristor-controlled reactor circuit 34 to operate as a variable inductor. Signal S8 is an output from the control circuit 50 used to operate the mechanical switch 22 in the capacitor bank 18. Signal S9 is used to control the operation of the switch 46 in the shunt circuit 44. This arrangement of static VAR compensator is new and it is called a thyristor controlled reactor—mechanically switch capacitor—mechanically switched reactor (TCR-MSC-MSR) design. In a conventional arrangement the reactors 36 and 38 would be untapped and no shunt circuit 44 would be used. This conventional arrangement is known as a thyristor controlled reactor—switched capacitor (TCR—MSC) static VAR compensator.

Under normal operating conditions the static VAR generator 10 operates as a conventional TCR-MSC system for providing VAR compensation to the AC network 12. The control circuit 50 determines the reactive power requirements necessary for the AC network 12 via the voltage and current signals S1 through S6 in the normal manner. The control circuit 50 in combination with the thyristor-controlled reactor circuit 34 and the capacitor bank 18, which are responsive to the control circuit 50 via signal lines 7 and 8, respectively, provide the necessary reactive power determined by the control circuit. The thyristors are operated in the phase controlled mode where the phase angle firing of the thyristors is used to control the current conducted through the thyristors. The control circuit 50 may be of a type similar to that described in U.S. Pat. No. 3,999,117, entitled "Method and Control Apparatus for Static VAR Generator and Capacitor", issued to L. Gyugyi and M. B. Brennen and assigned to the assignee of the present invention.

When transient and potentially damaging surge voltages occur and are detected by the control circuit 50 or when transient and potentially damaging surge currents occur in the thyristors controlled reactor circuit 34 and are detected by the control circuit 50, the shunt circuit 44 is operated by the control circuit via signal line S9. This operation is designed to occur before the thermal or current rating of the thyristor array is exceeded. Closing of the switch 46 creates a low impedance or short circuit path that effectively shunts the high surging currents away from the thyristor array 40. Because the transient surge current is bypassing the thyristor array 40, the thyristors can be operated in the phase controlled mode allowing for full current conduction by the thyristors if desired. Where the shunt circuit 44 is connected directly in parallel with the thyristor array 40, sufficient impedance is provided in series with the shunt circuit to limit the current through the switch to within its rated values. The precise value for the impedance for this arrangement is determined by the operating conditions and the current rating for the particular switch used in the shunt circuit.

In addition to the direct parallel connection, the shunt circuit 44 can be connected to the taps 42 on the reactors 36 and 38 as shown in the figure. The tapped reactors ensure that sufficient impedance is available to limit the current through the shunt circuit when closed thereby allowing the impedance connected in series with the shunt circuit to be removed if desired. Although either arrangement of the shunt circuit with respect to the thyristor array can be used, one is preferable to the other depending on the type of gate firing circuit that is used for the thyristor array.

In general there are two types of gate firing circuits for thyristors. These are (1) the remotely powered type and (2) the stored energy type. One example of the first type uses a remotely powered pulse transformer to provide the necessary gate firing pulses. The power required for the gate drive pulses is supplied from the remote power source which for the purposes of illustration is a power source other than that supplying power at the thyristors. The power source need not be physically remote from the thyristors. Here there is no need to store any energy locally at the thyristor. Hence the shunt circuit can completely short circuit the thyristor array where this type of gate firing circuit is used.

The second type of gate firing circuits is further divided into one of three kinds—voltage, current, or a combination of voltage and current. With a stored voltage energy circuit, the local voltage available across the thyristor pair is used as the energy store for the gate firing circuit. Similarly, for the stored current energy circuit the local current through the thyristor pair serves as the energy store for the gate firing circuit. The combination stored voltage-current energy circuit uses the available local voltage and local current for the gate firing circuit. As used here, local voltage and current is that voltage and current flowing through the thyristor being fired. With any of the stored energy circuits, a low level control signal is provided, usually via an optical coupler, to the gate firing circuit located at the thyristor. The gate firing circuit uses the locally available voltage and/or current to produce the actual gate firing pulses used to fire the thyristors. Where local current is used as the energy store, some current must be present in the thyristor circuit in order for the gate firing circuit to function. In the event of a transient if the local current was reduced to zero, i.e., the thyristor array is completely short circuited, no current would be available to refire the thyristors. Where local voltage is used, the thyristor firing time expressed in percent is always made to be less than 100%. If the thyristors were fired 100% of the time, the only voltage available to supply the gate firing circuit would be that equal to the forward voltage drop of the thyristor which is frequently insufficient to supply the required energy for the gate drive. With the combined stored voltage-current energy circuit, the individual problems of the voltage only and current only systems must be taken into account in the design of the gate firing control circuit. Thus where a stored energy gate drive circuit is used, the combination of the tapped inductor conjunction with the shunt circuit is preferred. The reason for this is that due to the mutual inductance coupling between the winding segments—here winding segments 36a and 36b and segments 38a and 38b of the reactors 36 and 38, respectively—sufficient voltage and current are present across the thyristor array 40 to allow operation of the stored energy gate drive circuits. This in turn permits the continued operation of the thyristors in the phase control mode including full rated current conduction by the thyristors.

For either type of shunt circuit arrangement, when the thyristor array is short circuited the currents through the reactors are limited by the combined impedance of the short circuit path comprising the reactors and the shunt circuit and by the magnitude of the applied voltage and not by the thermal or current ratings of the thyristor array that is used. Consequently, the thyristor array can be operated in the phase control mode during high transient current conditions without having to actually conduct the high currents. This means that the thyristors can be rated for normal line currents rather than the higher surge currents. This is a distinct advantage because the thyristors can now have a lower current rating than would otherwise be the case resulting in significant cost savings.

Referring again to the figure, the shunt circuit 44 when closed and the first segments 36a and 38a of the reactors form a first path with the second segments 36b and 38b of the reactors and thyristor array 40 forming a second path. The impedance of the first path is made lower than that of the second path. The impedance of the second path is variable because it is determined by the placement of the taps 42 and by the phase angle of conduction selected for the thyristors. With the thyristors fully conducting, i.e., they are in the full conduction mode, the impedance of the second path will have reached it lowest expected impedance value. The first path is designed so that its impedance will be lower than the minimum expected impedance for the second path. The transient surge current is divided in inverse proportion to the respective impedances of the first path and the second path. Proper design for the impedances of the two paths ensures that when the shunt circuit is closed the current flow through the thyristors will not exceed their rated values. Where stored energy gate firing circuits are used, the impedance of the second path is chosen so that the amount of current or voltage in the second path is sufficient to permit operation of the thyristor array in the phase control mode current conduction mode. The remaining surge current is carried by the first path through the shunt circuit 44.

In an alternate arrangement (not shown) a reactor or other impedance such as an inductor is added in series with the switch 46. Here the electrical impedance of the shunt circuit is designed to be significantly less than the impedance of the series circuit formed by the inductor segments 36b and and 38b and the thyristor array 40. This ensures that the shunt circuit will carry the greater portion of the surge current.

Transient surge current conditions during which the shunt circuit 44 can operate also include those periods when it is required to provide additional inductive compensation for a relatively short period of time, or when it is required to counterbalance unwanted capacitive compensation that may result due to untimely connection of the mechanically switched capacitors.

In addition to the voltage and current signals provided to the control circuit, thermally activated diodes or thermistors can be connected to the thyristors in the thyristor array 40 for actuating the shunt circuit 44 via the control circuit 50 before the thermal or current ratings of the thyristors in the thyristor array are exceeded. A reference signal corresponding to the thermal rating and one corresponding to the current rating of the thyristors would be provided in the control means for determining when operation of the shunt circuit is necessary in order not to exceed the thermal or current ratings of the thyristor array.

Although the switch 46 and the shunt circuit 44 can be rated to open or close on full line voltage and current, it is preferable that its operation be inhibited to those times when the thyristor array 40 is conducting. This is important because the cost of the mechanical switches can be reduced by ensuring that they only close when the voltages across the thyristor arrays are the sum of their forward voltage drops; and, this is significantly less than the line-to-line voltage that is present. Similarly, prior to opening the switch 46, it is preferable to ascertain that the thyristors are conducting. This ensures that the switch 46 is not required to open a high voltage. Alternatively, the control circuit 50 can be used to monitor operation of the switch 46 to open or close only during the zero crossing period of the current waveform. Accordingly, it will be appreciated that the speed of operation of the switch 46 should be reasonably fast. A suitable speed would be a few (less than 4) cycles of the supply frequency. Further, the rate of opening can be slower than the rate of closing of the switch 46, approximately 4 or 5 cycles of the supply frequency, provided that the thyristor array 40 is kept in a conducting state. The size and ratings of the reactors must be such as to provide the maximum inductive compensation needed during the overload or transient condition, rather than just for the normal operating conditions. The positions of the taps 42 on the reactors 36 and 38 and hence the reactance values of the segments 36a and 36b and of the segments 38a and 38b, and hence of the mutual inductance between segments 36a and 36b and between segments 38a and 38b are selected to provide a suitable value of voltage across the thyristor array 40 during the transient period as may be required for a selected set of operating conditions.

Other embodiments of the invention will be apparent to those skilled in the art from a consideration of the specification or from practice of the invention disclosed herein. It is intended that the specification be considered as exemplary only with the scope and spirit of the present invention being indicated by the following claims.

I claim:

1. A static VAR generator for providing reactive power compensation to an n-phase AC network subject to transient surge current, comprising:
    a capacitor bank for each phase comprising at least one capacitor in combination with mechanical switching means for switching the capacitor bank into the AC network when actuated;
    a reactor for each phase with a tap for dividing the reactor into a first segment and a second segment;
    a thyristor array electrically connected in series with each reactor and operable in a phase controlled mode for switching the reactor into the AC network when actuated;
    mechanically switched shunt circuit means having an impedance lower than that of the thyristor array and electrically connected in parallel with each thyristor array and the second segment of said reactor, the shunt circuit means operable between an open position and a closed position when actuated, the shunt circuit means when closed forming a low impedance path around the thyristor array for dividing the transient surge current between the shunt circuit means and the thyristor array such that the second segment provides voltage and current for operation of the thyristor array in the phase controlled mode without exceeding the current rating thereof during the occurrence of transient surge currents; and
    control circuit means for determining the reactive power requirements of the AC network with the combination of the thyristor array and reactor and the combination of the mechanical switching means and the capacitor bank being responsive thereto for providing the reactive power so determined, the control means further detecting transient surge current and actuating the shunt circuit means in response thereto.

2. A static VAR generator for providing reactive power compensation to an n-phase AC network subject to transient surge current, comprising:
- a capacitor bank for each phase comprising at least one capacitor in combination with mechanical switching means for switching the capacitor bank into the AC network when actuated;
- a reactor for each phase;
- a thyristor array electrically connected in series with each reactor and operable in a phase controlled mode for switching the reactor into the AC network when actuated;
- mechanically switched shunt circuit means having an impedance lower than that of the thyristor array and electrically connected in parallel with each thyristor array, the shunt circuit means operable, only when said thyristor array is in conduction between, an open position and a closed position when actuated, the shunt circuit means when closed forming a low impedance path around the thyristor array for dividing the transient surge current between the shunt circuit means and the thyristor array such that the thyristor array is operable in the phase controlled mode without exceeding the current rating thereof during the occurrence of transient surge currents; and
- control circuit means for determining the reactive power requirements of the AC network with the combination of the thyristor array and reactor and the combination of the mechanical switching means and the capacitor bank being responsive thereto for providing the reactive power so determined, the control means further detecting transient surge current and actuating the shunt circuit means in response thereto.

3. A static VAR generator for providing reactive power compensation to an n-phase AC network subject to transient surge current, comprising:
- a capacitor bank for each phase comprising at least one capacitor in combination with mechanical switching means for switching the capacitor bank into the AC network when actuated;
- a reactor for each phase;
- a thyristor array electrically connected in series with each reactor and operable in a phase controlled mode for switching the reactor into the AC network when actuated;
- temperature sensing means for measuring the temperature of the thyristor array;
- mechanically switched shunt circuit means having an impedance lower than that of the thyristor array and electrically connected in parallel with each thyristor array, the shunt circuit means operable between an open position and a closed position when actuated, the shunt circuit means when closed forming a low impedance path around the thyristor array for dividing the transient surge current between the shunt circuit means and the thyristor array such that the thyristor array is operable in the phase controlled mode without exceeding the current rating thereof during the occurrence of transient surge currents; and
- control circuit means for determining the reactive power requirements of the AC network with the combination of the thyristor array and reactor and the combination of the mechanical switching means and the capacitor bank being responsive thereto for providing the reactive power so determined, the control means further detecting transient surge current and actuating the shunt circuit means in response thereto, said control circuit means also responding to the temperature sensing means to close said shunt circuit means whenever the temperature of the thyristor array exceeds a predetermined value.

4. A static VAR generator for providing reactive power compensation to an n-phase AC network subject to transient surge current, comprising:
- a capacitor bank for each phase comprising at least one capacitor in combination with mechanical switching means for switching the capacitor bank into the AC network when actuated;
- a reactor for each phase;
- a thyristor array electrically connected in series with each reactor and operable in a phase controlled mode for switching the reactor into the AC network when actuated;
- mechanically switched shunt circuit means having an impedance lower than that of the thyristor array and electrically connected in parallel with each thyristor array, the shunt circuit means operable between an open position and a closed position when actuated, the shunt circuit means when closed forming a low impedance path around the thyristor array for dividing the transient surge current between the shunt circuit means and the thyristor array such that the thyristor array is operable in the phase controlled mode without exceeding the current rating thereof during the occurrence of transient surge currents;
- a second reactor connected in series circuit relationship with the mechanically switched circuit means with the resulting combination having an impedance significantly lower than that of the series circuit of the reactor and thyristor array; and
- control circuit means for determining the reactive power requirements of the AC network with the combination of the thyristor array and reactor and the combination of the mechanical switching means and the capacitor bank being responsive thereto for providing the reactive power so determined, the control means further detecting transient surge current and actuating the shunt circuit means in response thereto.

5. The apparatus of claim 2 wherein the mechanically switched shunt circuit means has a closing time of less than or equal to 3 cycles of the AC network.

6. A static VAR generator for providing reactive power compensation to an n-phase AC network subject to transient surge current, comprising:
- a capacitor bank for each phase comprising at least one capacitor in combination with mechanical switching means for switching the capacitor bank into the AC network when actuated;
- a first reactor for each phase;
- a second reactor for each phase, each reactor having a tap therein dividing each reactor into a first segment and a second segment;
- a thyristor array for each phase electrically connected in series with the second segment of each of the reactors;
- mechanically switched shunt circuit means electrically connected to the tap of each reactor in parallel with the combination of the thyristor array and the second segment of the reactor, the shunt circuit means operable between an open position and a closed position when actuated, the shunt circuit means when closed and the first segment of each reactor forming a first path with the second segment and thyristor array forming a second path with the first path having an impedance lower than that of the second path thereby dividing the transient surge current between the first path and the second path such that the current flow in the second path permits operation of the thyristor array in the phase control mode without exceeding the current rating thereof during the occurrence of the transient current; and control circuit means for determining the reactive power requirements of the AC network with the combination of the thyristor array and reactors and the combination of the mechanical switching means and the capacitor for each phase being responsive thereto for providing the reactive power so determined, the control means further detecting transient surge current with the shunt circuit means being responsive thereto for shunting the transient surge current around the thyristor array.

7. The apparatus of claim 6 wherein n equals 1.

8. The apparatus of claim 6 wherein n equals 3.

9. The apparatus of claim 6 wherein the control circuit means is further adapted to permit operation of the shunt circuit means only when the thyristor array is in the current conduction mode.

10. The apparatus of claim 9 wherein the mechanically switched shunt circuit means has a closing time of less than or equal to 3 cycles of the AC network.

11. The apparatus of claim 9 further comprising temperature sensing means for measuring the temperature of the thyristor array with the control means further adapted to respond to the temperature sensing means to close the shunt circuit means whenever the temperature of the thyristor array exceeds a predetermined value.

12. The apparatus of claim 6 where a third reactor is provided in series with the mechanically switched shunt circuit means with the resulting combination having an impedance significantly lower than that of the second path.

13. A static VAR generator for providing reactive power compensation to an n-phase AC network subject to transient surge current, comprising:

a capacitor bank for each phase comprising at least one capacitor in combination with mechanical switching means for switching the capacitor bank into the AC network when actuated.

a first inductor for each phase;

a second inductor for each phase, each inductor having a tap therein dividing each inductor into a first segment and a second segment;

a thyristor array electrically connected in series with the second segment of each of the inductors for each phase;

mechanically switched shunt circuit means electrically connected to the tap of each inductor in parallel with the combination of the thyristor array and the second segment of each inductor, the shunt circuit means operable between an open position and a closed position when actuated, the shunt circuit means when closed and the first segment of each inductor forming a first path with the second segment and thyristor array forming a second path with the first path having an impedance lower than that of the second path thereby dividing the transient surge current between the first path and the second path such that the current flow in the second path permits operation of the thyristor array in the phase control mode without exceeding the current rating thereof during the occurrence of the transient current; and control circuit means for determining the reactive power requirements of the AC network with the combination of the thyristor array and inductors and the combination of the mechanical switching means and the capacitor for each phase being responsive thereto for providing the reactive power so determined, the control means further detecting transient surge current with the shunt circuit means being responsive thereto for shunting the transient surge current around the thyristor array; and the control circuit means further adapted to permit operation of the shunt circuit means only when the thyristor array is in the current conduction mode.

14. The apparatus of claim 12 wherein n equals 1.

15. The apparatus of claim 12 wherein n equals 3.

16. The apparatus of claim 13 wherein the mechanically switched shunt circuit means has a closing time of less than or equal to 3 cycles of the AC network.

17. The apparatus of claim 12 further comprising temperature sensing means for measuring the temperature of the thyristor array with the control means further adapted to respond to the temperature sensing means to close the shunt circuit means whenever the temperature of the thyristor array exceeds a predetermined value.

18. The apparatus of claim 13 where a third inductor is provided in series with the mechanically switched shunt circuit means with the resulting combination having an impedance significantly lower than that of the second path.

* * * * *